(12) United States Patent
Wipasuramonton et al.

(10) Patent No.: US 7,658,400 B2
(45) Date of Patent: Feb. 9, 2010

(54) SIDE AIR BAG MODULE

(75) Inventors: Pongdet P. Wipasuramonton, Rochester, MI (US); Chang Hwan Ju, Rochester, MI (US); Sara A. Colburn, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 4 days.

(21) Appl. No.: 11/868,823

(22) Filed: Oct. 8, 2007

(65) Prior Publication Data

US 2008/0088118 A1 Apr. 17, 2008

Related U.S. Application Data

(60) Provisional application No. 60/829,090, filed on Oct. 11, 2006.

(51) Int. Cl.
*B60R 21/16* (2006.01)
(52) U.S. Cl. ............... 280/728.2; 280/730.2; 280/743.1
(58) Field of Classification Search ............... 280/728.1, 280/728.2, 730.2, 743.1, 743.2
See application file for complete search history.

(56) References Cited

U.S. PATENT DOCUMENTS

| | | | |
|---|---|---|---|
| 5,542,691 A | 8/1996 | Marjanski et al. | |
| 5,620,200 A * | 4/1997 | Garner et al. | 280/728.2 |
| 5,667,241 A * | 9/1997 | Bunker et al. | 280/730.2 |
| 5,833,266 A * | 11/1998 | Bartoldus et al. | 280/743.1 |
| 6,224,092 B1 | 5/2001 | Sakamoto et al. | |
| 6,364,348 B1 | 4/2002 | Jang et al. | |
| 7,090,243 B2 * | 8/2006 | Igawa | 280/728.2 |
| 7,226,077 B2 * | 6/2007 | Abe | 280/736 |

FOREIGN PATENT DOCUMENTS

KR 1020050027414 A 3/2005

\* cited by examiner

*Primary Examiner*—Eric Culbreth
(74) *Attorney, Agent, or Firm*—Markell Seitzman (57) ABSTRACT

A side air bag module including: an inflator (140), and air bag (102) and a retainer (150), the inflator having inflation ports (145) and a first and a second end (142, 144), the inflator configured to be inserted through a first opening of a first set of openings in an upper portion (104*a*) of a main panel (105) and configured to exit the upper portion of the main panel through a second opening of the first set of openings, wherein when the inflator is in place in the air bag, the first and second ends of the inflator respectively extend through one of the first and second openings, the main panel (105) also including a lower portion (104*b*) connectable to the upper portion thereby forming the main panel, a reinforcement panel (130) and the lower portion including similarly shaped, spaced and aligned sets of openings through which the inflator extends; the retainer is situated about the extending ends of the inflator on the exterior of the air bag.

15 Claims, 10 Drawing Sheets

SIDE AIR BAG MODULE

This application claims the benefit of U.S. Provisional Application 60/829,090, filed on Oct. 11, 2006. The disclosure of the above application is incorporated herein by reference.

BACKGROUND AND SUMMARY OF THE INVENTION

Most soft pack side air bag module designs in production today have the electrical connector hidden inside the cushion. That is, the inflator assembly and the electrical wire harness are first assembled and then placed inside the cushion. Such a design forces the cushion and inflator attachment scheme to have a large opening for inflator insertion and then the opening is closed by fabric flaps. Such a design causes a large amount of gas leakage around the inflator. Most of the time the leakage is not consistent, if not uncontrollable, since the gas pressure at the initial stage of inflation is very high due to high gas inflation rate and small volume prior to unfolding.

This invention solves these issues with exposed electrical connection, minimizing leakage and optimizes cushion strength. Furthermore, exposed electrical connection may ease the manufacturing step during the assembly of the air bag module since the attachment of electrical wires can be done at the last stage. In addition, the electrical wire harness with connector thereon can be routed in the seat prior to installation of the air bag module and is ready for connection to the exposed electrical termination or connector on the air bag inflator. This access may lead to possible cost saving.

Accordingly the invention comprises: a side air bag module including: an inflator 140, and air bag 102 and a retainer 150, the inflator having inflation ports 145 and a first and a second end 142, 144, the inflator configured to be inserted through a first opening of a first set of openings in a upper portion 104a of a main panel 105 and configured to exit the upper portion of the main panel through a second opening of the first set of openings, wherein when the inflator is in place in the air bag, the first and second ends of the inflator respectively extend through one of the first and second openings, the main panel 105 also including a lower portion 104b connectable to the upper portion thereby forming the main panel, a reinforcement panel 130 and the lower portion including similarly shaped, spaced and aligned sets of openings through which the inflator extends; the retainer is situated about the extending ends of the inflator on the exterior of the air bag. In one embodiment the reinforcement panel is part of the upper portion of the main panel and is movable so that the openings in the reinforcement panel and in the upper panel are in alignment. In another embodiment the reinforcement panel is a separate panel.

DETAILED DESCRIPTION OF THE DRAWINGS

Figure 2:
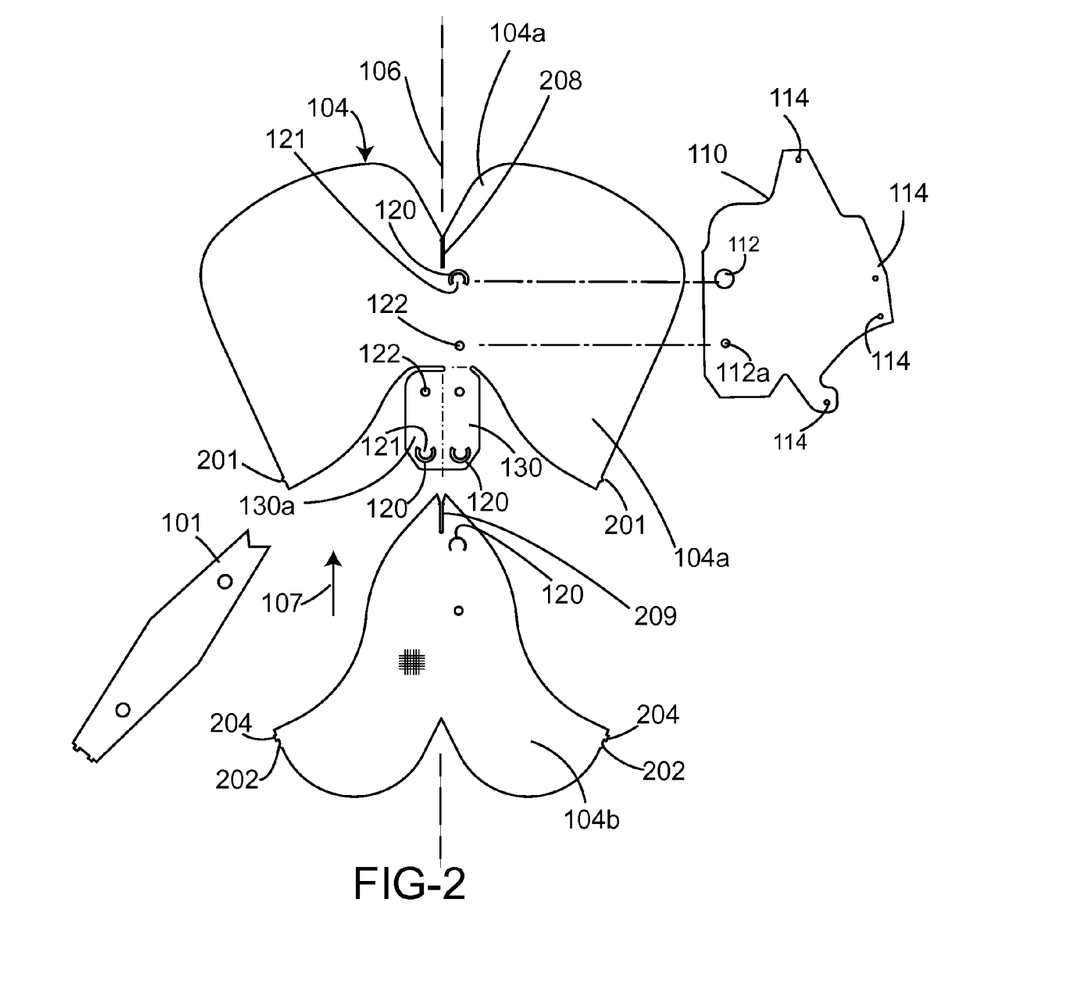
FIG. 2 shows the component parts of the air bag, with the upper portion of the main panel of the air bag having an integrally formed reinforcement panel.
Figures 2A, 2B:
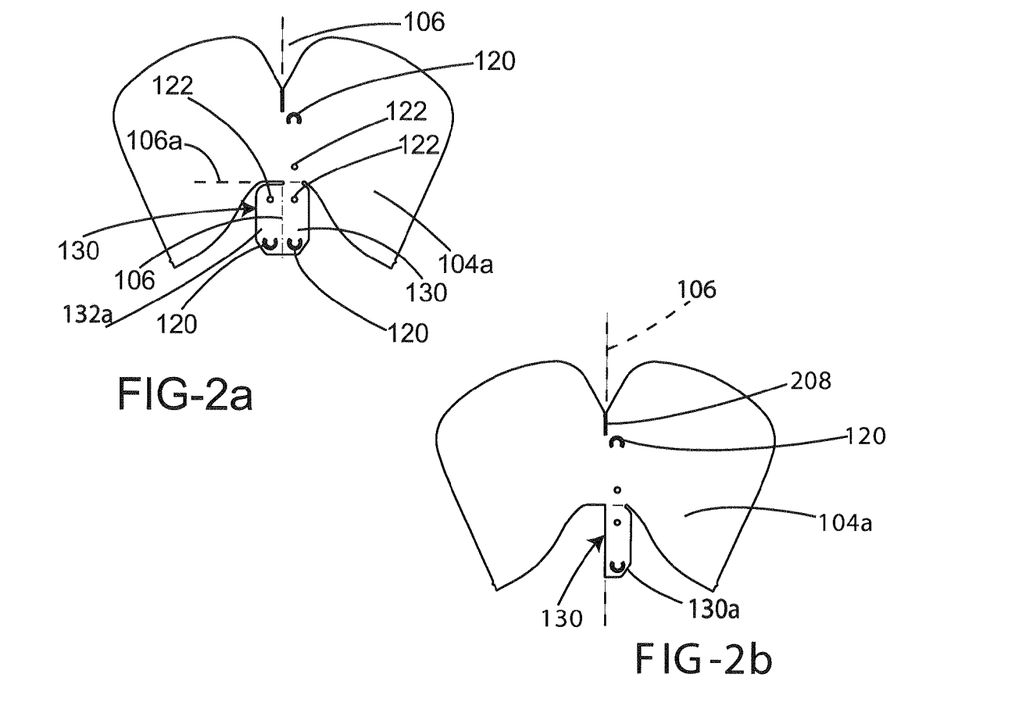
FIG. 2a is a plan view of the upper portion of the main panel as presented in FIG. 2.
FIG. 2b shows the upper portion of the main panel with integrally formed reinforcement panel folded about a vertical axis.

A completed cushion or air bag assembly 100 as shown in FIGS. 1-5 includes an inflatable air bag 102 and a panel of material used as a wrap or cover 110, which will keep a folded air bag 102 in its folded condition. The wrap can be a woven material or non-woven, including paper and Tyvek, and includes a line or perforations 116 or other easily tearable feature. As will be described below, the cover or wrap 110 can be secured to a main panel 105 (the main panel is shown in FIGS. 2d and 3a) of the air bag so as to reduce the number of parts/subassemblies needed during assembly or kept as a separate part.

The wrap or cover 110 also includes a first set of openings including a large circular opening 112 and a smaller opening 112a. These openings 112 and 112a receive portions of an inflator. The wrap 110 includes a second set of four openings 114, 114a, which receive fasteners such as a bolt of a bracket. If the wrap does not receive an inflator through openings 112 and 112a, these openings can be removed.

The air bag may include a single or multiple chambers. When configured as a multiple-chambered air bag, the air bag is divided by a separator that can be a separate panel of material, which is also called a tether or tether panel 101 herein. The tether 101 is configured such as by having openings therein to permit inflation gas to flow thereacross in a known manner. The air bag can also be separated into the various chambers by stitching the two sides of the main panel together using a line of stitches with large openings in the stitch line to permit inflator gas flow between the chambers.

The main panel 105 may comprise a single sheet of fabric such as a woven, coated fabric (the coating is used to control the permeability of the fabric) or an uncoated fabric. Alternately, as shown in the figures, the main panel 105 is formed by an upper portion or part 104a formed of a woven, uncoated fabric connected to a lower portion or part 104b formed of a woven coated fabric. Each of the upper and lower portions is generally symmetric about a fold line or axis 106 (see FIG. 2d) and divides the main panel into two substantially identical panel parts or halves 105a and 105b (see FIGS. 2d and 3a). In FIG. 2 the components of air bag 102, including the upper and lower parts 104a,b of the air bag, the tether 101, and the wrap 110 are separated from each other. Arrow 107 shows the relative direction in which the lower portion is moved to become slightly overlaid with the lower regions of the upper portion 104a.

Figure 3A:
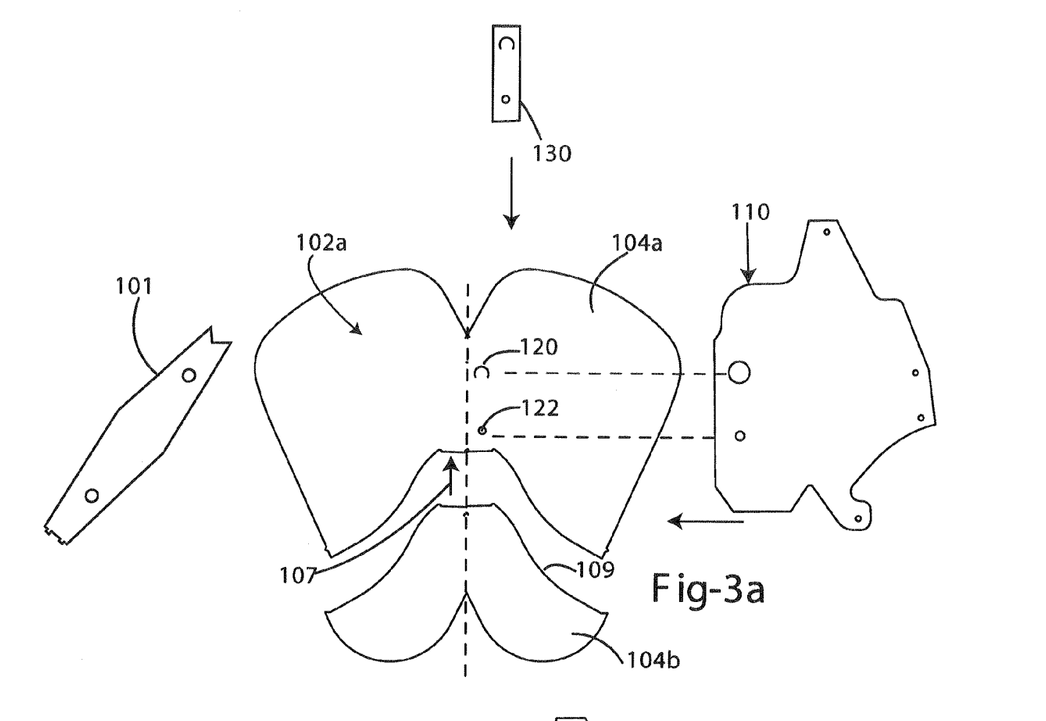
FIGS. 3a and 3b show an alternate embodiment of the invention and also show an air bag having a separate reinforcement panel.

The upper portion or part 104a includes a first opening such as a partial-circular slit or opening 120, the center portion thereof forming a bendable tab 121. The upper portion 104a also includes a second opening such as a full circular opening 122 located below the first opening or slit 120. The centers of openings 120 and 122 correspond to the spacing between the centers of openings 112 and 112a of the cover 110. Each of the upper and lower portion 104a,b includes alignment marks or manufacturing aids such as a small triangularly or rectangularly shaped extension of fabric designated by numerals 201 and 202 and 204. The lower portion 104b also includes the openings 120 and 122; a bendable tab 121 is associated with each opening 120. In this embodiment the air bag includes an integrally formed reinforcement panel 130 having two sets of openings 120 and 122. Before the lower portion 104b is moved upon and sewn to the upper portion, the integral reinforcement panel 130 is folded and moved to its proper orientation. In the embodiment of FIGS. 3 and 3a the reinforcement panel is a separate panel. FIG. 2a shows the upper portion 104a in isolation, and in FIG. 2b, the left hand portion 130a of the reinforcement panel has been folded over fold line 106 to yield the narrowed configuration. As can be appreciated, the reinforcement panel now has two levels of overlapping material with the two sets of openings 120, 122 and tabs 121 situated on top of each other. If such a level of reinforcement is not needed, the left hand side of the reinforcement panel can be removed.

Figure 2C:
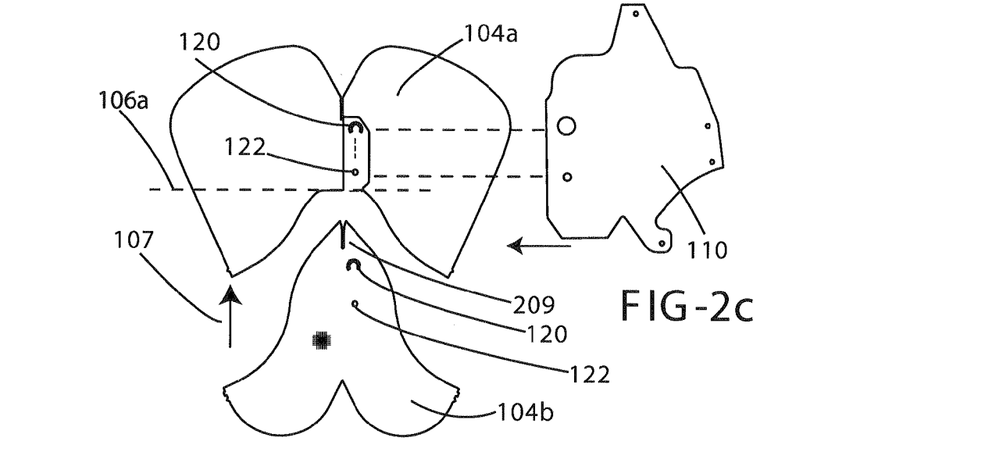
FIG. 2c shows the integrally formed reinforcement panel of the main panel folded a second time, this time about a horizontal axis and also shows the lower panel and a cover, both also shown in FIG. 2.
Figure 2D:
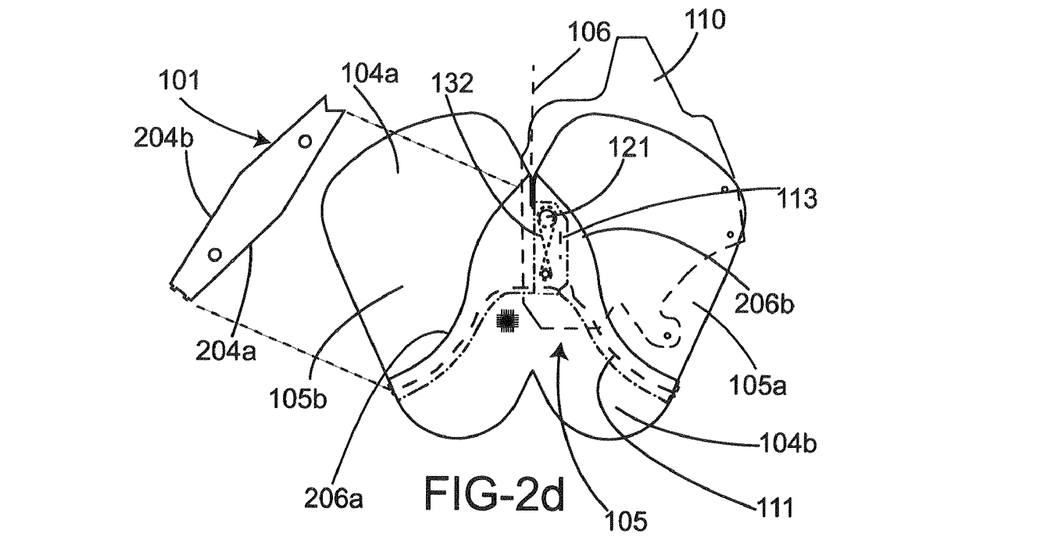
FIG. 2d shows the lower portion of the main panel secured to the upper portion of the main panel, as well as an internal tether.

In FIG. 2c the folded-over reinforcement of FIG. 2b is again folded over a horizontal axis or fold line 106a to the configuration shown in which the openings and tabs 120, 121, 122 in the reinforcement panel overlay the openings and tab in the upper portion 104a. To maintain the reinforcement panel in the illustrated orientation it can be sewn to the upper portion 104a or left loose as desired.

In FIG. 2c, arrow 107 illustrates that the lower portion or panel 104b will be moved to overlay with the upper panel. As shown in FIG. 2d the openings 120 and 122 of the lower panel are in alignment with the openings 120 and 122 of the reinforcement panel and upper portion or panel 104a and the lower portion 104b is sewn to the upper portion 104a along a seam such as seam 111. In FIG. 2c, for the purpose of illustration, the wrap 110 is shown displaced from the upper portion 104a and the wrap can be slid below the upper portion as shown in FIG. 2d and can be sewn to the upper portion 104a by a short line of stitches 113 (or by using the figure-8 pattern 132 discussed below) so that the wrap 110 can be considered a part of the main panel. The wrap or cover 110 can also remain loose from the air bag in which case it is not sewn to the upper portion 104a. As can be appreciated there are now four layers of material that are aligned to each other and each having the openings 120, 122 and tab 121, which provide for a robust reinforcement of this region of the air bag. These multiple panels are joined together by a figure-8 seam or stitch pattern 132 as shown in FIG. 2d, which extends about all of the aligned openings 120 and 122.

Figure 2E:
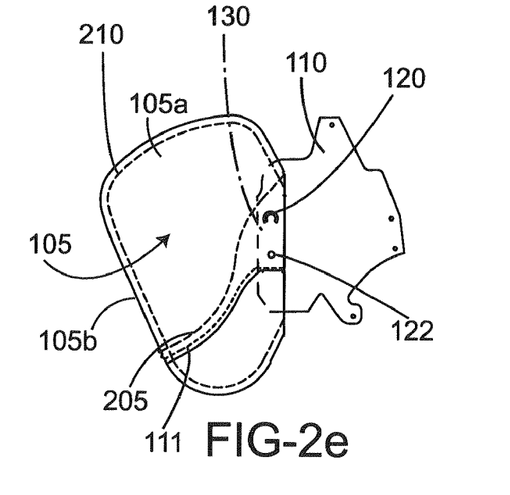
FIG. 2e shows a completed air bag.
Figures 4, 4A, 7:
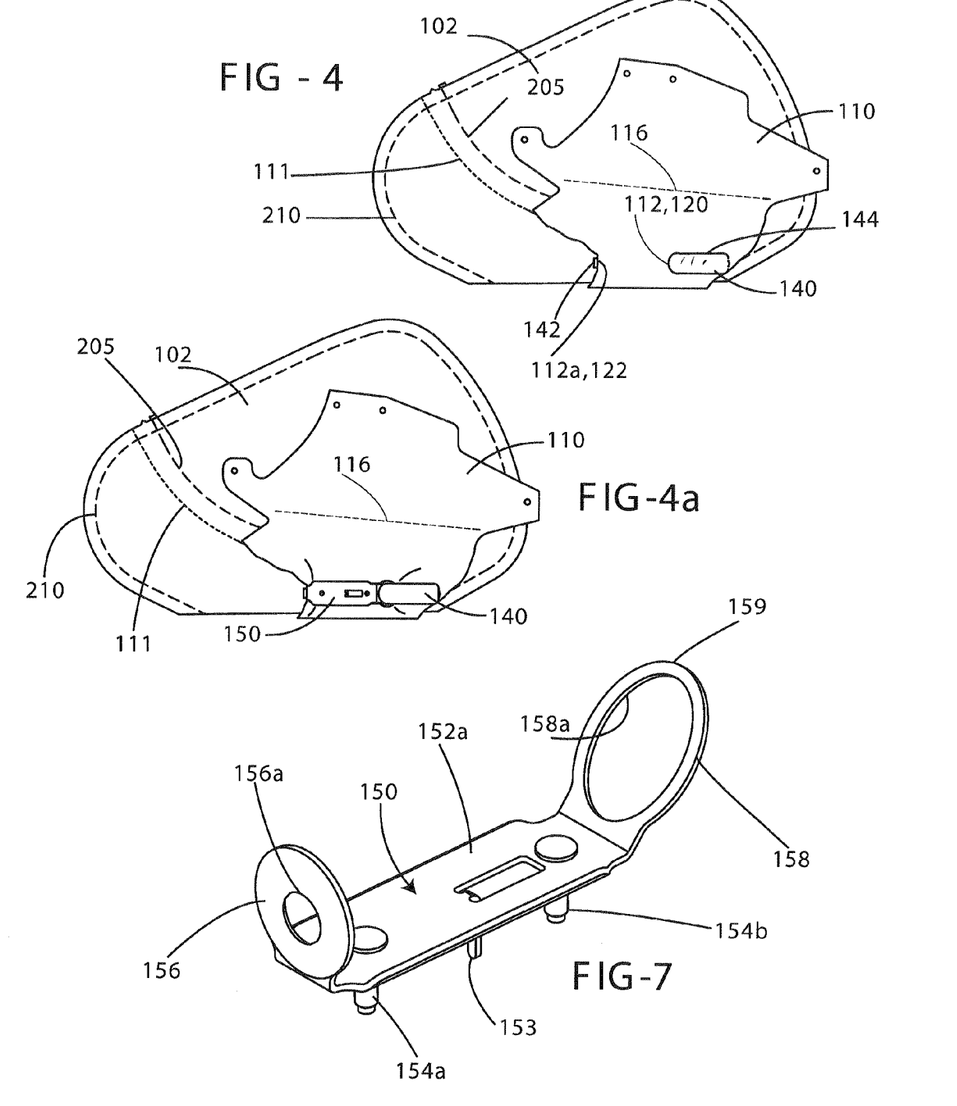
FIG. 4 shows a complete air bag assembly for either of the above embodiments folded over and also shows an inflator installed in the air bag.
FIG. 4a is a plan view again showing the inflator installed in the air bag, as well as an inflator retainer holding the inflator.
FIG. 7 is an isometric view of a retainer bracket.
Figures 6, 6A:
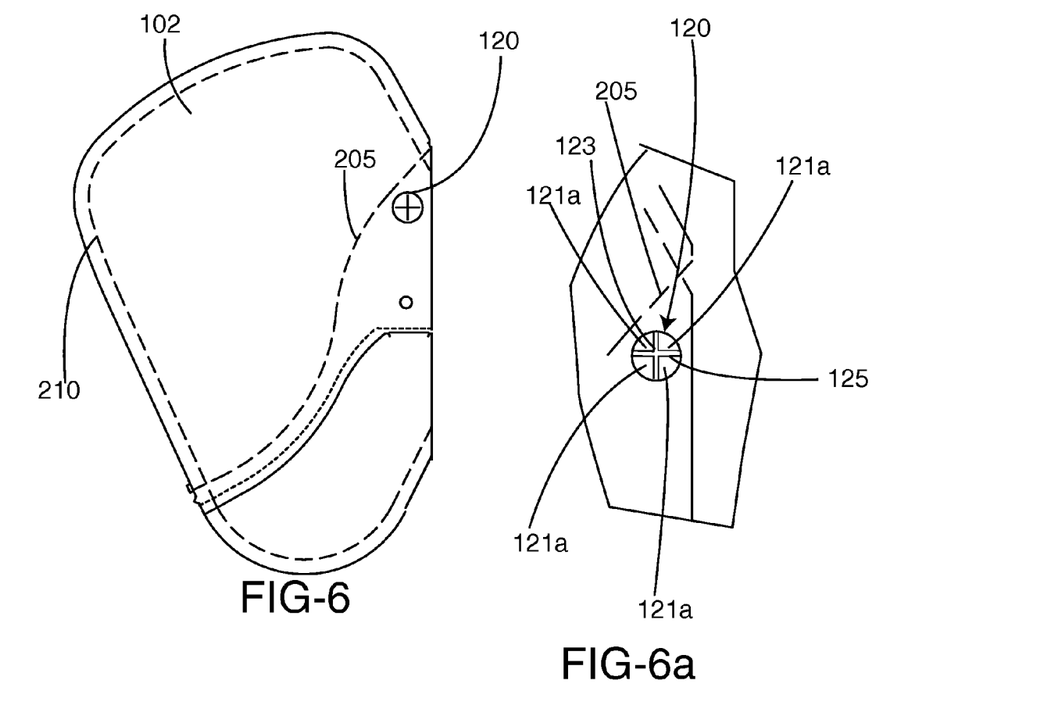
FIGS. 6 and 6a show an alternate way of achieving the inflator seal.

The tether panel 101 shown in FIG. 2 is also shown in FIG. 2d. If used edge or side 204a of the tether panel is aligned to and sewn by stitches 205 to the edge or side 206a of the lower portion or panel 104b. The seam of stitches 205 extends through the upper portion, the lower portion and the tether panel and is also shown in FIGS. 4, 4a and 6. With the side 204a secured in place the air bag components are manipulated to permit edge or side 204b of the tether panel to be aligned to and sewn by stitches 205 to the edge or side 206b of the lower portion or panel 104b. Subsequently, the configuration of FIG. 2d is folded about fold line 106 yielding the configuration of FIG. 2e. An inspection of the above figures shows that the top sections of the upper and lower portions 104a and 104b are split or slit (see numbers 208 and 209 of FIG. 2). The split or slit fabric permits the opposing areas of each side of the upper and lower portions to lie flat upon each other after the upper and lower panels are folded about fold line 106, making for a more compact configuration, which are then sewn closed by a peripheral seam 210.

Figure 3B:
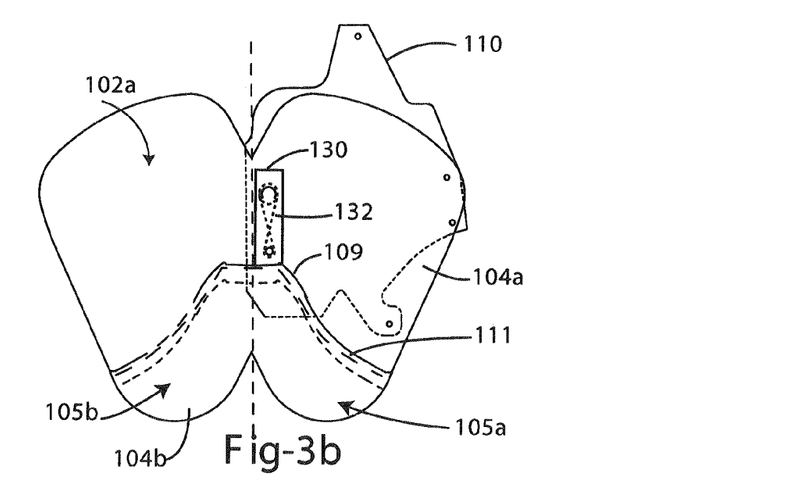

FIGS. 3a and 3b show an air bag 102a similar to air bag 102. In air bag 102 the reinforcement panel 130 is an integral part of the upper portion or panel 104 and the lower portion or panel 105 includes in its top portion the openings 120 and 122 which add another layer of material to the reinforcement of the inflator receiving openings 120 and 122 in the other panels. In air bag 102a, the integral reinforcement panel 130 has been replaced by a separate panel also identified by numeral 130. In addition, the openings 120 and 122 have been removed and the top portion of the lower portion 105 squared off. Neither the upper or lower portions include the splits or slit at their top. With the top portion of the lower portion 105 removed there are fewer layers of material overlaying the openings 120 and 122 on the upper portion 104. If the tether panel 101 is used, it is sewn to the upper and lower portions along the same trajectory and location as shown in FIG. 2d. The opposition portions of the assembled components shown in FIG. 3a are substantially the same as illustrated in FIG. 2d and when folded over fold line 106 yield a configuration similar to that shown in FIGS. 2e, 4 and 4a.

As shown in FIG. 3a the upper edge 109 of the lower part 104b rests above the lower edge of the upper part 104a. The two parts 104a, 104b are sewn together along sew line or seam 111 (shown in dotted line). The wrap 110 can be sewn to the right half of the upper parts with its opening 112 and 112a aligned with opening 120 and 122. The wrap can be sewn to the upper part in the same manner as mentioned in the first embodiment with a short line of stitches 113 or using the figure-8 pattern 132 so that the wrap 110 can be considered a part of the main panel. The sewn-together panels are folded over the fold line 106 yielding a configuration similar to that shown in FIGS. 2e, 4 and 4a. The two halves 105a and 105b of the main panel are sewn together along a peripheral sewn seam 222. The seam 222 used to close the panel halves 105a,b can also be used to tack or sew an end portion of the wrap to the panel half 105*a*. As previously mentioned the reinforcement panel 130 in this embodiment is a separate panel and also has slots 120 and 122. During assembly of the air bag, panel 130 is moved upon the upper part 104*a* with its openings 120 and 122 aligned to similar openings 120 and 122 in the upper panel. The reinforcement panel 130 can be secured to the upper part 104*a* by a separate seam such as a figure-8 loop which extends about openings 120 and 122.

Figure 1:
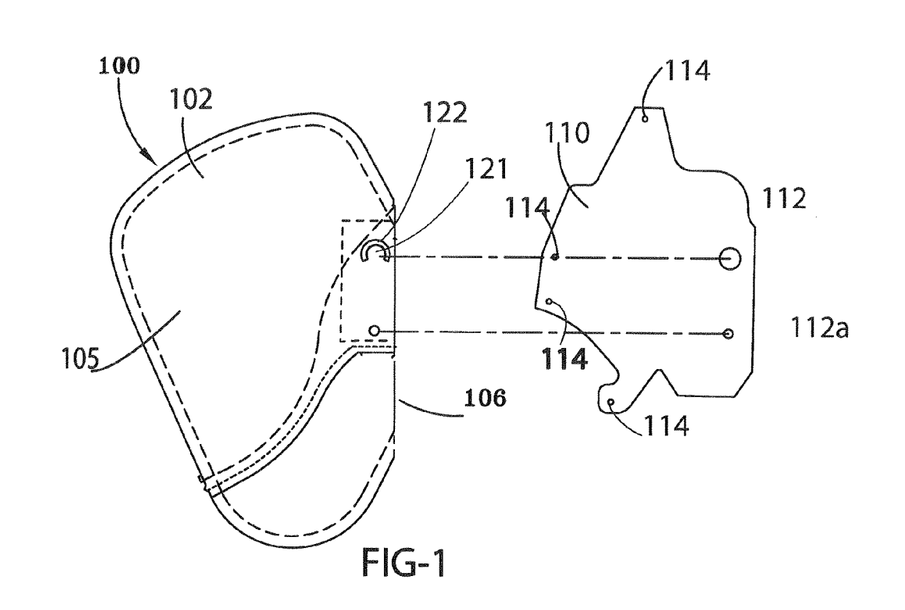
FIG. 1 shows the main components of a side impact air bag and cover according to the present invention.
Figure 1A:
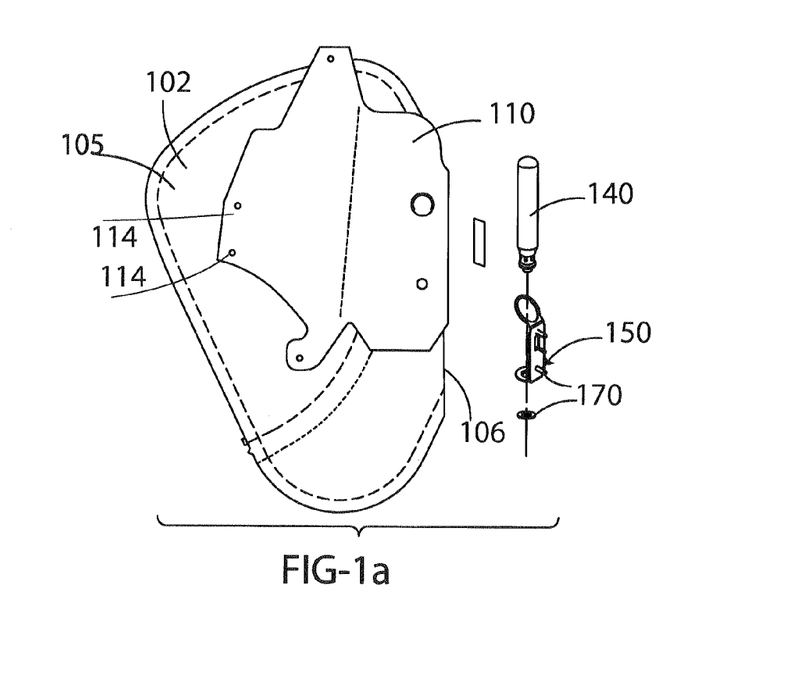
FIG. 1a shows a complete air bag as well as the other parts of an air bag module such as an inflator, an inflator retainer and retaining washer.

FIG. 1*a* shows the components of a side air bag module 200, which in addition to the air bag 102 (or air bag 102*a*) and wrap or cover 110 also includes an inflator 140, an inflator retainer (bracket or housing) 150, and a lock washer 170. The module may also include a wiring harness, which includes an electrical connector, which connects through an electric terminal or connecter to an igniter, which is a part of the inflator.

Figure 5:
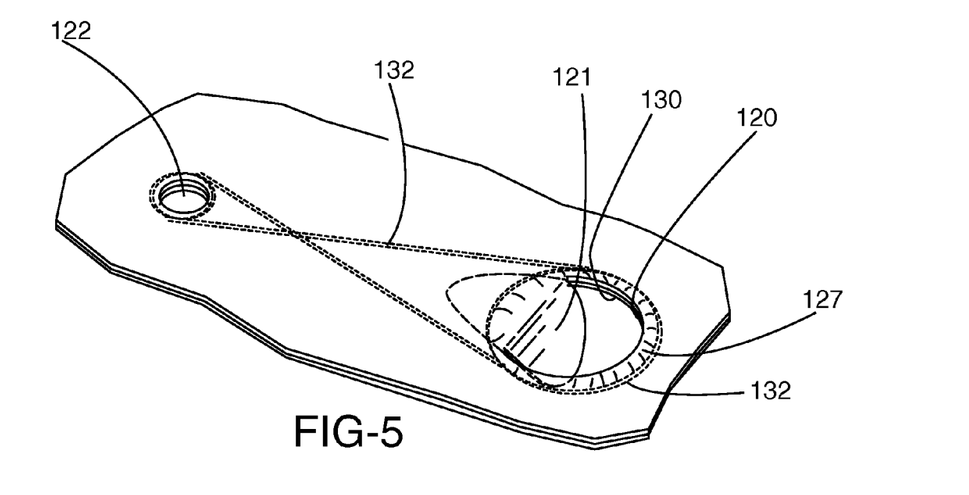
FIG. 5 is a partial view of a portion of the air bag and is a close-up view of an inflator opening with a single integral tab or flap pushed through the larger opening of the air bag.
Figure 8:
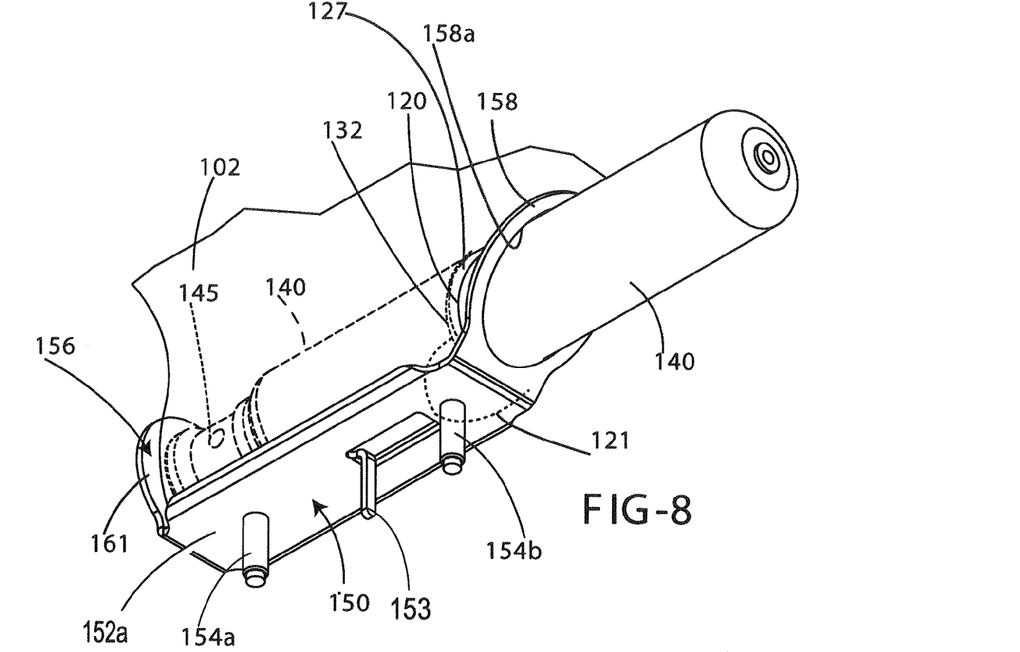
FIG. 8 is a close-up view of the inflator seal with the inflator in the air bag (partially shown) and with the inflator extending through the inflator retainer.
Figure 9:
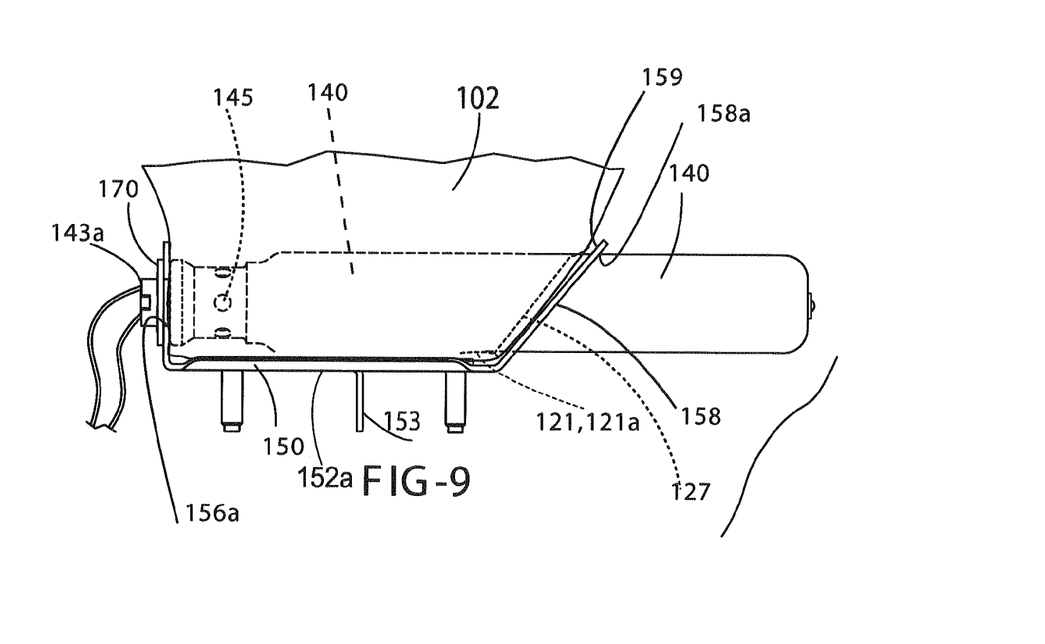
FIG. 9 is a side view of the components of FIG. 8.

From the above figures, the air bag and in particular panel 105*a* supports a plurality of aligned large openings 120, smaller openings 122 and tabs 121. As mentioned, one or more of these other openings 120 and 122 are included in the reinforcement panel 130 and the lower panel 104*b*. These openings function as inflator receiving openings. Also, if the wrap includes openings 112 and 112*a* these too function as inflator receiving openings. The aligned tabs 121 of the various panels when bent over form a self-sealing inflator seal against a portion of the exterior of the inflator 140. In FIG. 5 the opening 120 is partially circular and is of a sufficient diameter allowing for the stretching of the fabric to permit entry of the inflator. In FIG. 5 the aligned tabs 121 are shown as being pushed into the interior of the air bag. This orientation could be achieved if manually pushed in or if the tab were moved inwardly as the inflator is being moved into the opening 122. The reinforcement panel 130 and connecting figure-8 seam 132 are also shown in FIG. 5. As shown in FIG. 5 the bent portion of the tab 121 is straight but that portion will conform to the circular shape of the walls of the inflator upon insertion of the inflator in opening 120. Additionally, the material 127 between the edge of opening 120 and the stitches forming the seam 132 will be pushed and bent inwardly (also shown in FIG. 5) upon insertion of the inflator, this bent material also contributing to the seal about the inflator. As mentioned the aligned tabs 121 form a seal along one side of the inflator 140 which is also shown in FIGS. 8 and 9. FIG. 6*a* shows an alternate configuration wherein the large opening 120 is formed by two crossing slits 123 and 125. The slits form four tabs 121*a* in the shape of petals which petal inwardly and press on four sides of the body of the inflator to create another seal between the air bag and the inflator in the same manner as shown for tab 121 in FIG. 9.

The inflator 140 as shown diagrammatically in FIGS. 1*a*, 4 and 4*a* includes a small or narrow end 142 (near the inflator's integral electrical connector 143) and a large end 144 and a center cylindrical hollow body 146 (which stores propellant and/or gas, for example, or gas if the inflator is a gas storing inflator). Before the inflator 140 is inserted into the air bag the openings 112 and 112*a* of the wrap 110 are aligned with openings 120 and 122. This alignment should be automatic if the wrap 110 was secured to the main panel. If the wrap is loose, it is placed over panel half 105*a* and the openings 112-120 and 112*a*-122 aligned. The inflator 140 is placed inside the air bag in the following manner. The narrow end 142 of the inflator 140 is first positioned near the large opening 112 of the wrap (if used) and pushed within the air bag through opening 112 and through the opening 120 (and opening 120 in any reinforcement panel). The inflator is then manipulated so the small end 142 extends out of the small and now aligned openings 122 and through opening 112*a* in the wrap, if used. The inflator will be properly positioned with the larger end 144 extending from the large openings 112 and 120 and the small end 142 of the inflator extending from openings 112*a* and 122 as shown in FIG. 4. The exit ports 145 of the inflator are located in the narrow end 142.

Figure 11:
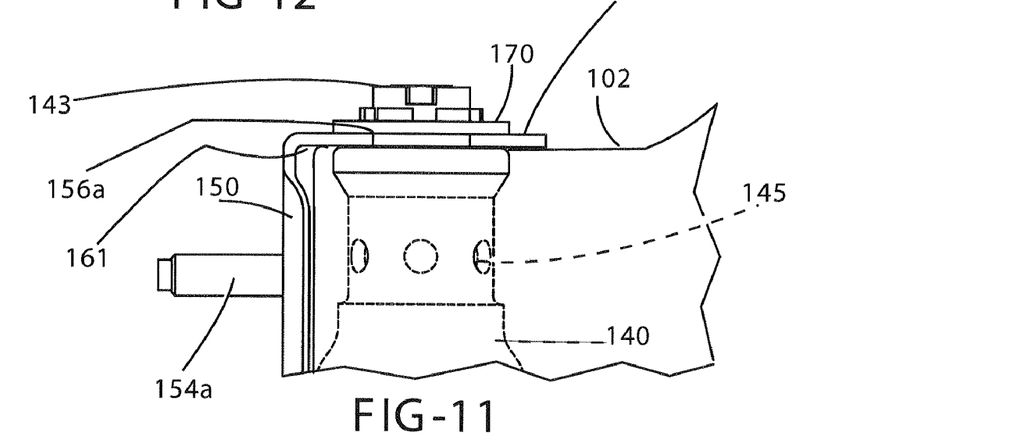
FIG. 11 is a partial side view showing the washer mounted on the connector-end of the inflator and also shows the gas outlets or exit ports of the inflator.

As previously mentioned the module 200 also includes a retaining bracket also referred to as retainer 150, which is shown in FIGS. 1*a*, 7 and other figures. The bracket 150 holds the inflator and air bag together and also provides a mechanism by which the module can be secured to a mounting surface. The inflator retainer 150 includes a body 152 having a center portion or base 152*a* that supports two threaded fasteners 154*a, b* that are used to mount the module to a seat frame and are also useful in holding the wrap 110 to the folded air bag. A part of the base 152*a* is bent down to form a pin 153 useful in aligning the bracket with a hole in the mounting surface. The retainer includes a first end 156 that is bent about 90 degrees to the center portion, the first end including a small opening 156*a* which is slightly larger than the small, cylindrically shaped narrow end 142 of the inflator 140 that sticks through this opening 156*a*, as shown in FIGS. 9 and 11. The retainer 150 includes a second end 158, which is maintained at an angle relative to the center or base portion; this second end 158 also includes an oval opening 158*a*. End 158 is a resilient extension of the base 152*a* and can rotate slightly relative to the base and holds the inflator in place as the edges of the opening bite into the material of the inflator. Returning briefly to FIG. 4, the following describes a way to secure the retaining bracket 150 about the inflator 140. Opening 158*a* of the retainer is slipped about end 144 of the inflator and the center portion 152*a* of the retainer aligned to the center portion of the inflator (which is inside of the air bag). In this orientation the retaining bracket is outside of the air bag and that portion of the wrap 110 between openings 112 and 112*a*. In this orientation the air bag (and wrap, if used) are against the inner side 159 of end 158. The inflator 140 is slid rearward further into opening 158*a* so that the narrow end 142 of the inflator and that part of the air bag (and wrap, if used) proximate opening 122 can be moved adjacent an inner side 161 of end 156 of the retaining bracket 150. The inflator 140 is moved toward end 156 and manipulated so end 142 enters opening 156*a*.

As mentioned end 142 of the inflator also houses an electrical connector 143 having one or more electrical contacts. The wiring harness 143*a* shown in FIG. 9 connects to the connector 143. As can be seen, the electrical connection 143 is located exterior of the air bag 102 or 102*a*. In the embodiment illustrated the retainer 150 is exterior to the air bag, as more fully shown in FIGS. 8 and 9.

As shown in FIGS. 4, 8 and 9, the large end and the small end of the inflator are positioned extending from exterior of the air bag through the openings 120 and 122. (If the wrap were used the air bag would also extend through openings 112 and 112*a*, which are not shown in FIGS. 8 and 9.) FIG. 9 more clearly shows the folded-over tab 121 which forms the gas seal against the side of the inflator 140. When the air bag is inflated with inflation gas, the gas gets in between the rolled or bent-over tabs 121 or tabs 121*a* (of FIGS. 6 and 6*a*) and pushes the tab 121 (or tabs 121*a*) forcefully against the sides of the inflator forming a gas seal, limiting gas loss thereacross.

Figure 10:
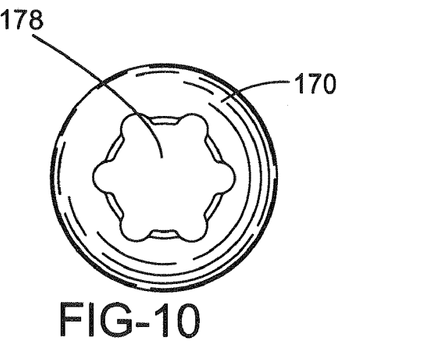
FIG. 10 is a plan view of a domed-shaped washer with internal teeth or projections.
Figure 10A:
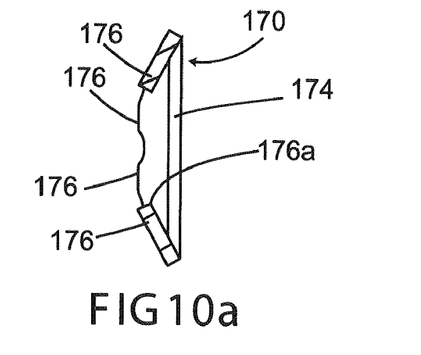
FIG. 10a is a cross-sectional view of the washer of FIG. 10.
Figure 11A:
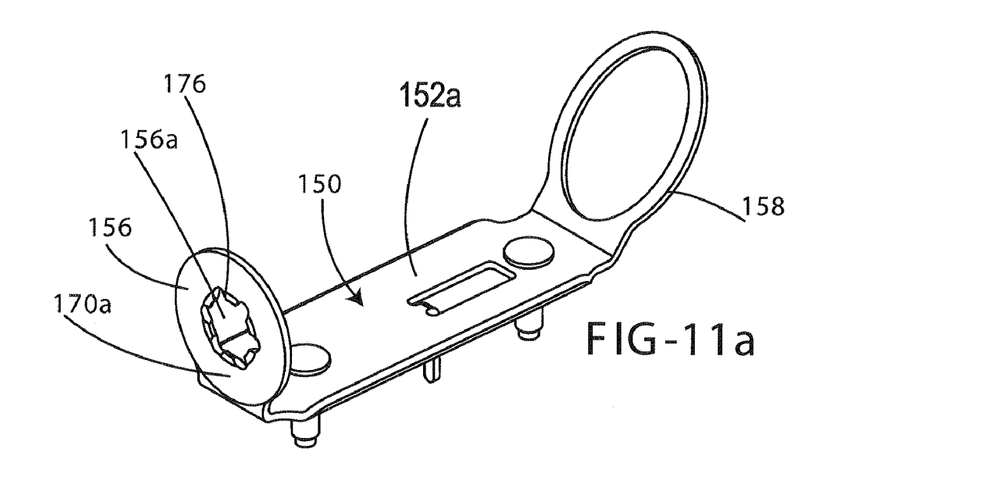
FIG. 11a shows an alternate embodiment of the invention.
Figure 12:
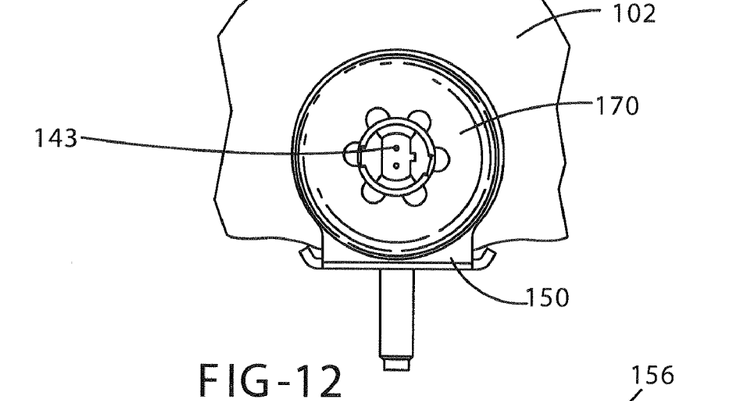
FIG. 12 is an end view of the washer in place on the connector-end of the inflator.

The lock washer 170, shown in isolation in FIGS. 10 and 11*a*, is formed, stamped metal and is initially concave or conical in shape, and includes an annular concave shaped body 174 and a plurality of internally extending projections 176 formed about an opening 178. After the retainer has been placed about the inflator, the washer 170 is placed about the small end 142 of the inflator extending from end 156 of the bracket 150. In this configuration, the inner surface 176a of each projection 176 is spaced about or touches the small end of the inflator and the washer which also rests against the outside of end 156 of the retainer. Thereafter the washer 170 is compressed or flattened against end 156 of the retainer; this process urges the projections 176 inward to crimp or clamp against the cylindrical side of the end 142 of the inflator 140 and secures the inflator to the retainer. When the curved or conically shaped washer is flattened, the inside diameter of the projections becomes smaller in diameter and fixes on the outside surface of the small cylinder of the inflator. FIG. 11 shows the washer in its flattened state and the projections will resist any pulling force of the lock washer by the inflating cushion.

In another embodiment shown in FIG. 11a, the features of the lock washer 170a are incorporated into the end 156 of the inflator retainer that receives the narrow or small end of the inflator. In FIG. 11a the projections 176 of washer 170 are formed as an integral part of end 156 about opening 156a. Upon insertion of end 142 of the inflator in opening 156a the washer, including projections 176, can then be flattened or compressed by similar fashion as with the separate washer, as described above. By doing this one component can be eliminated, thus possibly leading to cost saving.

Figure 13:
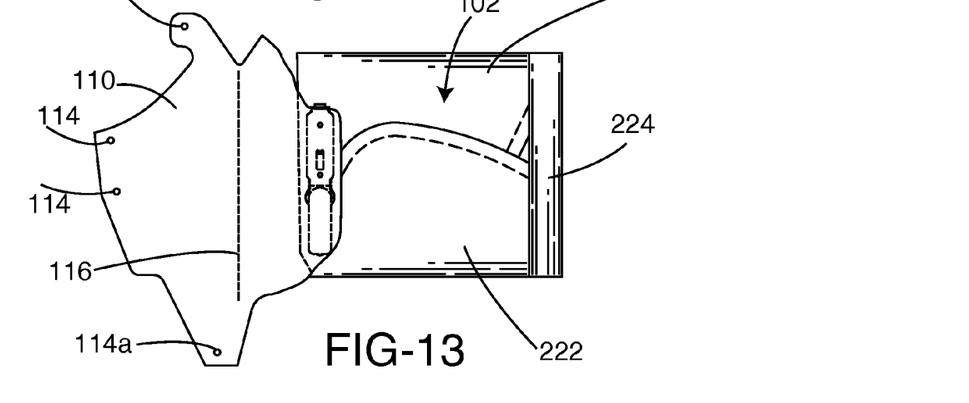
FIG. 13 is a view showing a partially folded air bag, with the fabric cover (of FIG. 2) positioned over the inflator (which has already been mounted to the air bag and to the inflator retainer).
Figure 13A:
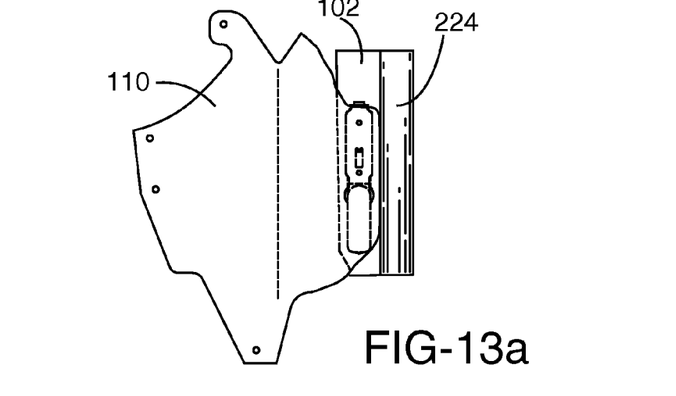
FIG. 13a shows a more fully folded air bag.

Reference is briefly made to FIG. 13, which shows the air bag in a partially folded state. In FIG. 13 the wrap 110 is shown receiving the inflator 140 through its openings 112 and 112a, secured to the air bag (at the two openings) and has been folded above the inflator (which is underneath the wrap and not visible). The wrap is first peeled or pulled away from the cushion to prevent it from interfering with the air bag fold. As illustrated a portion 220 of the air bag adjacent the narrow end 142 has been folded toward the center of the air bag and an opposing portion of the air bag adjacent the wider end 144 has been folded toward the center of the air bag. Additionally, a portion of the air bag opposite the inflator has been rolled or folded toward the inflator; numeral 224 shows the rolled or folded portion. To complete this version of a fold, the rolled or folded portion 224 is further rolled or folded bringing it up to the inflator 140 as shown in FIG. 13a.

Figure 14:
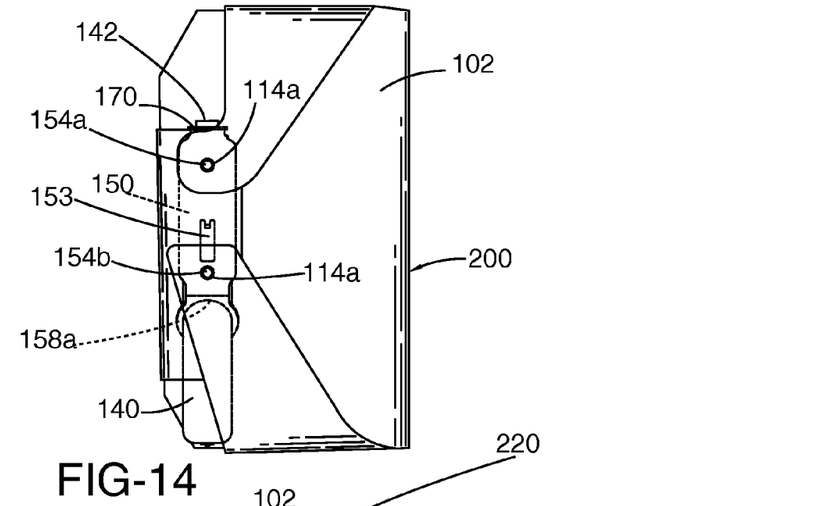
FIG. 14 shows the inflator with the folded air bag adjacent the inflator and with the cover looped about the folded air bag with the cover secured to mounting studs which are part of the inflator retainer.

The configuration in FIG. 13 is flipped up-side-down with the wrap below the folded air bag. As can be appreciated if the inflator were not inserted through the wrap as described above, it would still be used to hold the folded air bag in place. In this situation the openings 112 and 112a are not needed and are removed from the wrap 110. Then the two small mounting holes 114 in the center-side of the wrap are placed over the two receiving studs 154a and 154b of the inflator retainer (as illustrated in FIG. 14). The other two ends of the wrap shown as the upper and lower flaps in FIG. 13 also contain one small hole 114 each. These two flaps are then pulled over to fit the small holes 114a onto the same two studs 154a and 154b of the inflator retainer as shown in FIG. 14, securing the wrap about the folded air bag, preventing the air bag from unfolding.

Many changes and modifications in the above-described embodiment of the invention can, of course, be carried out without departing from the scope thereof. Accordingly, that scope is intended to be limited only by the scope of the appended claims.

The invention claimed is:

1. A side air bag module including: an inflator (140), and air bag (102) and a retainer (150), the inflator having inflation ports (145) and a first and a second end (142, 144), the inflator configured to be inserted through a first opening (120) of a first set of openings in an upper portion (104a) of a main panel (105) and configured to exit the upper portion of the main panel through a second opening (122) of the first set of openings, wherein when the inflator is in place in the air bag, the first and second ends of the inflator each respectively extend through one of the first and second openings (120, 122), the main panel (105) also including a lower portion (104b) connectable to the upper portion (104a) thereby forming the main panel (105), the lower portion including a second set of similarly shaped, spaced and aligned first openings (120) and second openings (122) through which the inflator extends, and wherein the module includes a reinforcement panel (130) having a third set of first and second openings (120, 122) of like size and orientation relative to the openings (120, 122) of the upper portion and aligned to those openings in the upper portion of the main panel, the reinforcement panel (130) secured to the upper portion (104a) and formed as an extension of the upper portion of the main panel (105).

2. The module according to claim 1 wherein the reinforcement panel is an integral part of the upper portion and is configured to be folded about a first fold line (106a) to align the third set of inflator receiving openings in the reinforcement panel with the first set of openings in the upper portion of the main panel.

3. The module according to claim 2 wherein the reinforcement panel includes a first part (130) with the third set of openings comprising two inflator receiving openings and a second part (130a) with a fourth set of inflator receiving openings comprising two additional inflator receiving openings, the second part configured to be folded over a second fold line to bring the fourth set of inflator openings into alignment with the third set of openings, wherein the aligned sets of openings in the reinforcement panel are themselves alignable with and are of the same size and spacing as the openings in the upper portion of the main panel.

4. The module according to claim 3 wherein one of the openings (120) into which the inflator is received is configured to have material (127) about the one opening (120) engage with a side of the inflator forming a seal to retard the flow of inflation gas through the one opening.

5. The module according to claim 4 wherein the one opening is formed with a tab (121) bendable to a position along the side (146) of the inflator, the bendable tab forming a part of the seal, the material 127 about an edge of the one opening forming another part of the seal.

6. The module according to claim 5 wherein for each set of openings, one of the openings in each set is the same size as the first opening and is aligned to the first opening, the inflator passing through each opening that is aligned to the first opening, and wherein for each set of openings, another of the openings in the set is the same size as the second opening and is aligned to the second opening, the inflator passing out of the air bag through each opening that is aligned to the second opening.

7. The module according to claim 6 wherein each of the openings that is respectively aligned to the first opening and to the second opening is maintained together and in alignment by at least one seam (132) of stitches.

8. The module according to claim 1 wherein the first opening is formed by a concave shaped slit.

9. The module according to claim 1 wherein the first opening is formed by a pair of intersection slits (123, 125).

10. The module according to claim 1 wherein the retainer (150) has a first and second end (156, 158) and a connecting portion (152a) each of which is located outside of the air bag, the first end of the retainer secured about the first end of the inflator and the second end of the retainer secured about the second end of the inflator.

11. The module according to claim 1 includes a lock washer (170) received over one end of the inflator and upon compression of the lock washer against the retainer the lock washer holds the one end of the inflator in place.

12. A side air bag module including: an inflator (140), and air bag (102) and a retainer (150), the inflator having inflation ports (145) and a first and a second end (142, 144), the inflator configured to be inserted through a first opening of a first set of openings in an upper portion (104a) of a main panel (105) of the air bag and configured to exit the upper portion of the main panel through a second opening of the first set of openings, wherein when the inflator is in place in the air bag, the first and second ends of the inflator each respectively extend through one of the first or second openings, the main panel further includes a lower portion (104b) connectable to the upper portion thereby forming the main panel, the upper portion including an integrally formed reinforcement panel (130) having a second set of openings (120, 122) of like size and orientation relative to and aligned with those openings in the upper portion of the main panel, through which the inflator extends.

13. The module according to claim 12 wherein the lower portion of the main panel includes a third set of openings aligned to the other sets of openings in the upper portion and in the reinforcement panel.

14. The module according to claim 13 includes a lock washer (170) received over one end of the inflator and upon compression of the lock washer against the retainer the lock washer holds the one end of the inflator in place.

15. A side air bag module (200) comprising: an inflator (140), and air bag (102) and a retainer (150), the inflator having inflation ports (145) and a first and a second end (142, 144), the air bag (102) inflated by the inflator and including a first set of inflator receiving openings including at least a first and a second inflator receiving opening (120, 122), the inflator configured to be inserted into the air bag through the first inflator receiving opening and configured to exit the air bag through the second inflator receiving opening, wherein when the inflator is in place in the air bag, the first and second ends extend from a corresponding inflator receiving opening, and wherein the inflation ports of the inflator are situated within the air bag;

the air bag (102) comprising a main panel (105) including an upper portion (104a) and a lower portion (104b) connectable to the upper portion, the upper portion including two inflator receiving openings (120, 122), the lower portion made from a material having a coated fabric to control permeability and the upper portion (104a) made from a material having an uncoated fabric, the main panel including the upper portion and lower portion being symmetric about a center line (106);

wherein the retainer (150) has a first and second end (156, 158) and a connecting portion (152a) each of which is located outside of the air bag, the first end of the retainer secured about the first end of the inflator and the second end of the retainer secured about the second end of the inflator.

* * * * *